United States Patent
Kaasa et al.

(10) Patent No.: US 9,950,293 B2
(45) Date of Patent: Apr. 24, 2018

(54) METHOD AND SYSTEM FOR LOWERING THE WATER DEW POINT OF A HYDROCARBON FLUID STREAM SUBSEA

(75) Inventors: Baard Kaasa, Ranheim (NO); Bernt Henning Rusten, Jakobsli (NO); Knut Arild Marak, Trondheim (NO); Arne Olav Fredheim, Trondheim (NO)

(73) Assignee: STATOIL PETROLEUM AS, Stavanger (NO)

( * ) Notice: Subject to any disclaimer, the term of this patent is extended or adjusted under 35 U.S.C. 154(b) by 663 days.

(21) Appl. No.: 14/130,393

(22) PCT Filed: Jul. 1, 2011

(86) PCT No.: PCT/EP2011/061147
§ 371 (c)(1),
(2), (4) Date: Feb. 28, 2014

(87) PCT Pub. No.: WO2013/004275
PCT Pub. Date: Jan. 10, 2013

(65) Prior Publication Data
US 2014/0157658 A1    Jun. 12, 2014

(51) Int. Cl.
*C10L 1/18* (2006.01)
*C10L 5/00* (2006.01)
(Continued)

(52) U.S. Cl.
CPC ............ *B01D 53/265* (2013.01); *C10L 3/106* (2013.01); *C10L 3/107* (2013.01); *B01D 2256/245* (2013.01)

(58) Field of Classification Search
CPC .............. G06T 17/00; B01D 2256/245; B01D 53/265; C10L 3/106; C10L 3/107
(Continued)

(56) References Cited

U.S. PATENT DOCUMENTS

| 3,676,981 A | 7/1972 | Afdahl et al. |
| 5,127,231 A | 7/1992 | Larue et al. |

(Continued)

FOREIGN PATENT DOCUMENTS

| CA | 2040833 A1 | 10/1992 |
| FR | 2 893 515 A1 | 5/2007 |

(Continued)

OTHER PUBLICATIONS

International Search Report, dated Mar. 27, 2012, issued in PCT/EP2011/061147.

(Continued)

*Primary Examiner* — Latosha Hines
(74) *Attorney, Agent, or Firm* — Birch, Stewart, Kolasch & Birch, LLP

(57) ABSTRACT

The present invention concerns a method for lowering the water dew point subsea in a produced multiphase hydrocarbon fluid stream containing water, the method comprising the steps of: separating (10) the hydrocarbon fluid stream (1) into a liquid phase (3) and a first gas phase (2); cooling (20) the first gas phase in a controlled manner to knock out water or condensing water and optionally other condensates while keeping the fluid above a hydrate formation temperature thereof; separating off condensed liquids (6) and a second gas phase; wherein the second gas phase (8) has a water dew point which is lower than that of the initial multiphase hydrocarbon fluid stream. The invention also concerns a system for lowering the water dew point subsea.

24 Claims, 2 Drawing Sheets

(51) Int. Cl.
*B01D 53/26* (2006.01)
*C10L 3/10* (2006.01)

(58) Field of Classification Search
USPC .................... 196/102; 208/187; 44/445, 639
See application file for complete search history.

(56) References Cited

U.S. PATENT DOCUMENTS

| | | |
|---|---|---|
| 2006/0260468 A1 | 11/2006 | Amin |
| 2007/0144943 A1 | 6/2007 | Lemaire et al. |
| 2008/0190291 A1 | 8/2008 | Krehbiel et al. |
| 2010/0000254 A1* | 1/2010 | Hiraide .................... C10L 3/10 62/621 |
| 2011/0220352 A1* | 9/2011 | Lund ....................... E21B 43/34 166/265 |

FOREIGN PATENT DOCUMENTS

| | | | |
|---|---|---|---|
| GB | 2 326 423 A | 12/1998 | |
| RU | 2199375 C1 * | 2/2003 | |
| RU | 2199375 C1 | 2/2003 | |
| WO | WO 2008/035090 A1 | 3/2008 | |
| WO | WO 2008035090 A1 * | 3/2008 | ................ C10L 3/06 |
| WO | WO 2008/147219 A2 | 12/2008 | |
| WO | WO 2010/002272 A1 | 1/2010 | |

OTHER PUBLICATIONS

Written Opinion of the International Searching Authority, dated Mar. 27, 2012, issued in PCT/EP2011/061147.
U.S. Office Action issued in U.S. Appl. No. 14/646,791, dated Mar. 9, 2017.

\* cited by examiner

METHOD AND SYSTEM FOR LOWERING THE WATER DEW POINT OF A HYDROCARBON FLUID STREAM SUBSEA

FIELD OF THE INVENTION

The invention concerns a method and system for water dew point depression in subsea transport of produced gas.

BACKGROUND

In development of remote or marginal offshore oil and gas fields, subsea developments are often selected in order to reduce investments in production facilities. Although the hydrocarbons produced on site need processing, the number of subsea process units is preferably low and the units of reduced complexity for minimal maintenance and in order to avoid malfunctions. For further processing it is desirable to utilise process capacity within existing infrastructure either offshore or onshore, which may require transportation over long distances by pipelines.

The hydrocarbon well fluid will often contain both oil and gas which may be separated in a subsea separation unit and then either transported separately to the same processing unit or be transported to different processing units to utilize capacity of surrounding infrastructure. The produced hydrocarbon-containing fluid is warm when entering the wellhead, generally in the range of 60-130° C. and will in addition to hydrocarbons contain liquid water and water in the gas phase corresponding to the water vapour pressure at the current temperature and pressure. If the gas is transported untreated over long distances, it will cool, the water in gas phase will condense and below the hydrate formation temperature, hydrates will form. The hydrate formation temperature is in the range of 20-30° C. between 100-400 bara.

Hydrates are ice-like crystalline solids composed of water and gas, and hydrate depositions at the inside wall of gas and/or oil pipelines is a severe problem in today's oil and gas production infrastructure. When warm hydrocarbon fluid containing water flows through a pipeline with cold walls, hydrates will precipitate and adhere to the inner walls. This in turn will reduce the pipeline cross-sectional area, which without proper counter measures will lead to a loss of pressure and ultimately to a complete blockage of the pipeline or other process equipment. Transportation of gas over distance will therefore normally require hydrate control.

Existing technologies that deal with the problem of removing such deposits or avoiding them include:
- Addition of inhibitors (thermodynamic or kinetic), which prevent hydrate deposition.
- Electric heating and insulation keeping the pipeline warm (above the hydrate appearance temperature).
- Mechanical scraping off the deposits from the inner pipe wall at regular intervals by pigging.

To avoid formation of hydrate, a thermodynamic or kinetic hydrate inhibitor can be added, such as an alcohol (methanol or ethanol) or a glycol such as Monoethylene Glycol (MEG or 1,2-ethanediol), which is inexpensive and simple to inject. However, if the water content is high, proportional large amounts of inhibitor are needed which at the receiving end or on site will require a hydrate inhibitor regeneration process unit with sufficient capacity to recover and recycle the inhibitor. A recovery may be performed by a MEG regeneration unit, but will contribute to an increase in both costs and investments, especially if installed on site at subsea level.

Therefore, there is a need for removing both liquid water and water in the gas phase from a produced hydrocarbon-containing fluid, wherein the ratio of liquid and gas phase is dependent on the water vapour pressure at the prevailing temperature and pressure. The water removal in a hydrocarbon-containing gas, or the water dew-point depression, should be performed before the temperature of the fluid drops below the hydrate formation temperature and. In addition, reduced quantities of hydrate inhibitors compared to prior art should be used to avoid regeneration at subsea, i.e. before long transport by pipeline subsea in cold sea water, such as 5 km or more, for example 10, 20, 30, 50, 75 or 100 km or more.

Electric heating above the hydrate formation temperature is very expensive due to both high installation and operational costs. Accordingly, electric heating is not feasible for long-distance transport.

Another method to reduce or avoid the use of hydrate inhibitor is to insulate the pipeline and reduce the diameter to increase the flow rate and thereby reduce temperature loss and water accumulation. If the pipeline is not too long, such as in the order of 1-30 km, it will be possible to keep the temperature above the hydrate formation temperature, at which hydrates form. However, this reduces the operational window of the pipeline, and it will not have capacity for future higher gas rates and cannot be operated at low gas rates. Boosting might also be required, as the pipeline pressure drop will be important due to a small sized pipeline. In addition, hydrate formation will occur during production stops and shut downs as the hydrocarbons are cooled below the formation temperature.

Pigging is a complex and expensive operation. If no loop is available, a pig has to be inserted sub-sea using remote-operated vehicles. If more hydrates are deposited than the pig diameter is designed for, the pig might get stuck in the pipeline, resulting in costly operations and stop in production to remove the pig.

RU 2199375 concerns a method for absorption drying of hydrocarbon gas by using a primary separation step and a cooling step where the gas temperature and dew point of gas is controlled by addition of an absorbent before the cooler, and a second separation step where the absorbent is regenerated for further transport of the gas. The removal of bulk water in the first separation step reduces the load on the absorber, but with the use of an absorber at least one regeneration unit is necessary, which is undesirable in subsea installations.

U.S. Pat. No. 5,127,231 concerns the treatment of a gas from a production well by contacting the gas with a liquid phase, containing water and anti-hydrate additive, in a unit separating off a liquid phase and an additive charged gas which is transported over long distances, which may be several kilometers. An almost conventional drying process is described involving a contactor with absorbent (glycol). The gas is cooled during transport before entering a heat exchanger where condensate of water solvent and additive is separated from the gas in a settlement vessel. The liquid phase is recycled to the production site. Hence, anti-hydrate additive is added during the first separation and is present during the main transport before cooling, after which the additive is separated at the end reception terminal where the gas is treated.

The methods described above make use of recirculation of anti-hydrate additive introduced during the first separation step on the well stream. This introduction of additive necessitates an absorber unit for regeneration of the additive.

CA 2,040,833 concerns a method for preventing formation of hydrates in subsea piping by passing a well stream through a separator at controlled pressure, and boiling off light hydrocarbons form the liquid phase in such an extent that substantially no hydrates are formed. The formation may additionally be prevented by addition of glycol as hydrate inhibitor. The choking of the well stream to evaporate light components and water, results in a reduced pressure, which must be regained by a compressor. Depending on the gas/oil ratio (GOR) the amount of water and the composition of the stream resulting from the pressure reduction will vary and the application is therefore limited to fluids with a suitable phase diagram. In addition the entire well stream is cooled in this document, which requires a large capacity cooler.

An important object of the present invention is to reduce the number of process units at subsea and to minimize the amount of anti-hydrate additive is used, so that the gas phase from a production well that may be transported over large distances in cold water without causing hydrate formation, while requiring no or little additive regeneration when reaching a process unit.

SHORT DESCRIPTION

The invention concerns a method and system for water dew point depression subsea to avoid hydrate formation by water removal from produced gas. The purpose of the invention is to reduce the water content in a produced gas to an acceptable level where the amount of hydrate inhibitor needed is correspondingly low.

In one aspect the invention concerns a method for water dew point depression subsea in a produced multiphase hydrocarbon fluid stream containing water, the method comprising the steps of:
  i) separating the hydrocarbon fluid stream into a first liquid phase and a first gas phase;
  ii) cooling the first gas phase in a controlled manner to knock out water or condense water and optionally other condensates into a second liquid phase while keeping the fluid above a hydrate formation temperature thereof; and
  iii) separating off the second liquid phase and a second gas;
wherein the second gas phase has a water dew point which is lower than that of the first gas phase and/or the initial multiphase hydrocarbon fluid stream.

In this manner the first gas phase is cooled down to a temperature above 20° C., or in the range of 20-30° C., or about 25° C., and in addition the cooled first gas phase may be free of hydrate inhibitor and/or absorbent.

A hydrate inhibitor may then be added to the second gas phase before further transport over a distance subsea. Also, the second gas phase may be compressed before addition of hydrate inhibitor and transported over a distance subsea.

Further, the method may comprise the additional steps of:
  iv) adding hydrate inhibitor (such as a small amount) to the second gas phase;
  v) cooling the second gas phase in a controlled manner to knock out water or condense water and optionally other condensates into a third liquid phase; and
  vi) separating off the third liquid phase and a third gas phase;
wherein the third gas phase has a lower water dew point than the second gas phase, and/or the first gas phase and/or the initial multiphase hydrocarbon fluid stream.

The cooling step v may be performed by a heat exchanger using surrounding seawater or a cooling medium, or it may be done by choking the gas stream to obtain Joule Thomson cooling, or a combination of heat exchanging and choking.

The second gas phase may hence be cooled down to a temperature below 0° C., or in the range of about 0-25° C., or in the range of about 0-4° C., or to about the surrounding seawater temperature.

Hence, the second gas phase may be cooled down to a temperature of about sea temperature, or below sea temperature. With this additional cooling no liquid water drop out will occur in the gas pipeline if kept at the same pressure or lower pressure. Further inhibition of the third gas phase is therefore normally not necessary. Inhibitor injection (such as glycol) may still be required depending on degree of cooling by choking, hence water dew point depression, and dependent on pressure increase by compression.

Additionally, a hydrate inhibitor may be added to the third gas phase before further transport over a distance subsea. Also, the third gas phase may be compressed before optional addition of hydrate inhibitor and transport over a distance subsea.

In one alternative the cooled second gas phase may be choked after cooling in step v) and before separation in step vi) in order to further cool the gas, and the second gas phase may hence be cooled down to a temperature of about sea temperature, or below sea temperature.

In a further alternative, liquid water may additionally be separated from the produced multiphase hydrocarbon fluid stream in step i) and said separated liquid water may be re-injected in sub terrain formations.

In another alternative the second liquid phase of knocked out water or condensed water and other condensates from the separation in step iii) and optionally the third liquid phase from step vi) are mixed with the first liquid phase from the separation in step i). In yet another alternative the second liquid phase of knocked out water or condensed water and other condensates from the separation in step iii) and optionally the third liquid phase from step vi) are recycled to the separation in step i), optionally by use of a pump.

The first liquid phase, optionally mixed with the second liquid phase and optionally the third liquid phase may be transported to further processing plants, alternatively with the help of boosting.

The hydrate inhibitor(s) may be chosen from one or more of:
  thermodynamic inhibitors, such as alcohols, e.g. ethanol, methanol, glycols, such as monoethylene glycol (MEG), diethylene glycol (DEG) or triethylene glycol (TEG), or amines such as monoethanolamine (MEA) or methyldiethanolamine (MDEA); or
  kinetic inhibitors or anti-agglomerants, known as low dosage hydrate inhibitors (LDHI), e.g. polymers, copolymers or surfactants.

With the additional steps above, a hydrate inhibitor may alternatively be added to the second gas phase before cooling and the cooled second gas phase may be choked after cooling in step iv) and before separation in step v).

In a second aspect the invention concerns a system for water dew point depression subsea in a produced multiphase stream, wherein the system comprises:
  i) a first separator having a multiphase stream inlet, a first gas phase outlet and a first liquid phase outlet;
  ii) a first gas cooler with temperature control for water knock out having an inlet and outlet; and
  iii) a second separator having an inlet, a condensate outlet and a gas outlet;

wherein the gas phase outlet of the first separator is in fluid communication with the gas cooler inlet and the gas cooler outlet being in fluid communication with the second separator inlet and wherein gas exiting the second separator gas outlet has a water dew point which is lower than that of the multiphase stream entering the first separator.

The gas outlet of the second separator may be connected to a gas transport conduit for further transport subsea and the gas transport conduit may also comprise an addition point for hydrate inhibitor.

In addition, the gas transport conduit may comprise a compressor or pump, and in the case of the presence of an hydrate inhibitor addition point the compressor or pump is positioned upstream of said addition point.

Further, the system above may additionally comprise:
iv) an addition point for hydrate inhibitor;
v) a second gas cooler with temperature control for water knock out having an inlet and outlet; and
vi) a third separator having an inlet, a condensate outlet and a gas outlet;
wherein the second separator outlet is in fluid communication with the inlet of the second gas cooler, said fluid communication comprising the addition point for hydrate inhibitor, and wherein the second gas cooler outlet is in fluid communication with the third separator inlet and wherein gas exiting the third separator gas outlet has a water dew point which is lower than that of the fluid entering the second separator.

The gas outlet of the third separator may be connected to a gas transport conduit for further transport subsea and the gas transport conduit may comprise a further addition point for hydrate inhibitor. In addition, the gas transport conduit may comprise a compressor or pump and in the case of the presence of an hydrate inhibitor addition point the compressor or pump is positioned upstream of said addition point.

The conduit connecting the second separator outlet with the inlet of the second gas cooler and said conduit comprises a hydrate inhibitor addition point.

In another alternative, a conduit connects the second gas cooler outlet to the inlet of the third separator wherein said conduit comprises a regulating choke.

A compact separation technology may be used for one or more of the separators, such as inline separation technology or a scrubber. Also, the first separator may be a three-phase separator comprising a fluid inlet, a gas phase outlet, a liquid condensate outlet and a liquid water outlet. Further, the liquid water outlet of the three-phase separator may be connected to a wellhead for re-injecting in sub terrain formations.

The condensate outlets of the separators may be connected to a conduit for transport to a further processing plant, optionally connected to a pump or compressor for boosting of said transport. Alternatively one or both of the condensate outlets of the second and third separators are connected to a conduit for recycling said condensates to the first separator.

Hence, by using a subsea cooler, the present invention avoids pressure reduction and is flexible with regards to what cooling temperature is required.

In addition the resulting liquid phase remains warm, and having a much greater heat capacity than the gas phase, the separated liquid stream may be transported over long distances, such as from 5 km or more, before it is cooled to the extent that hydrates form. Hence, the method according to the present invention is also suitable for liquid dominated systems.

None of the known applications use a separator-cooler-scrubber setup as in the present invention in order to remove water and then transferring the gas with minimum injection of hydrate inhibitor. Also, none of the known processes combines a water knock-out process with a gas transport process.

DRAWINGS

The invention will in the following be described in further detail by example embodiments with reference to the appended drawings, none of which should be construed as limiting the scope of the invention.

DETAILED DESCRIPTION

In the following, it is of importance to specify certain differences between the two terms of "water removal" and gas "drying".

"Water removal" means removing a bulk amount of water from a stream and does not result in a dry gas per se. In the example shown later in the example embodiments, about 97% of the water is removed by cooling which for practical use is considered as a removal of almost all water. During transport of the gas, the above removal of water will make it necessary to add much less hydrate inhibitor than if no water had been removed by cooling.

"Gas drying" concerns the drying of a gas in order to satisfy a specification of a pipeline, which often requires having a water dew point of −18° C., and wherein the water content must be reduced to the ppm-range to satisfy such requirements.

The most common method for achieving gas drying is by the aid of absorption wherein water is absorbed by an absorbent. The absorbent may for example be a glycol, such as TriEthylenGlycol (TEG). The mentioned need for a low level of water content by use of absorption also requires a regeneration plant in order to remove water from the glycol.

Another method to obtain such low water content in gas drying is by the aid of expansion and thereby cooling. This method may be performed by a valve or a (turbo) expander, where the work generated by the expanding gas may be re-used in a compressor in order to partly regain the pressure. The temperature of an expander may reach very low temperatures, such as below −25° C., and it is therefore necessary to add a hydrate/ice inhibitor to the gas before it enters the expander.

The present invention concerns water dew point depression and water removal and not gas drying in order to satisfy the need for few components and secure operations with low maintenance needs.

By "dew-point depression" is understood the process of reducing the liquid-vapour dew point of a gas by removing a fraction of the liquid from the gas.

By "water knock-out" is understood the removal of water by condensation.

Figure 1:
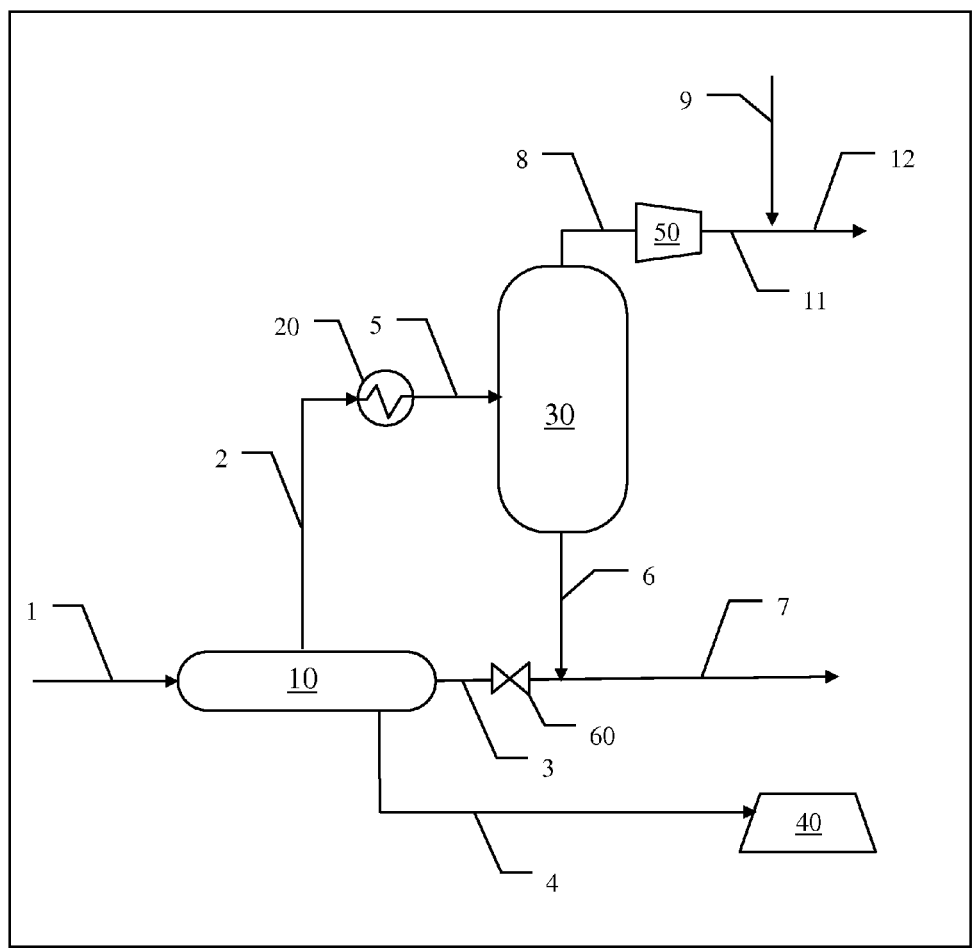
FIG. 1 shows a schematic view of a subsea plant for water dew point depression and water removal according to the present invention.

FIG. 1 shows one embodiment of a process layout for a system and method according to the invention wherein a multiphase hydrocarbon-containing well stream in a pipeline 1 is first separated into a first gas phase in a conduit 2 and a first liquid phase in a conduit 3 by a first separator 10, which may be a conventional separator or of more compact separation technology, e.g. of inline separation technology.

The separator 10 may be a two-phase separator or more preferably a three-phase separator as shown in FIG. 1. In the former case of a two-phase separator, gas is separated from a mixture of hydrocarbon and water in a liquid phase exiting in conduit 3. In the latter case as shown in FIG. 1, the liquid phase is additionally separated into a separate liquid water phase in conduit 4 and a liquid hydrocarbon phase is separated out in conduit 3.

The composition and phase distribution of the well stream may vary according to temperature, pressure and the specific production field, but will often contain a certain amount of water of which the bulk part is separated off in separator 10. The separated liquid water phase in conduit 4 may lead to a well head 40 to be re-injected in the sub terrain formations.

The first gas phase in conduit 2 is then cooled in a multiphase gas cooler 20 to a temperature as low as possible to knock out water, but not into the hydrate formation temperature region. The gas and condensed liquids of water and condensate are passed from the cooler 20 by conduit 5 to a second separator 30 such as a condensed water scrubber, where they are separated into a second liquid phase exiting in conduit 6 and a second gas phase exiting the second separator by conduit 8. The second separator 30 may be a conventional separator or of more compact separation technology, e.g. of inline separation technology or a scrubber.

The condensed liquids in the second liquid phase from the second separator 30 leaving in conduit 6 are mixed with the first liquid phase 3, which may be a mainly a hydrocarbon stream, from the first separator to a combined liquid phase in conduit 7. A regulating valve 60 on conduit 3 upstream of the mixing point of conduits 6 and 3 may be present, in order to prevent flashback into the first separator and/or to regulate the mixing rate and composition of said streams. Said combined liquid phase being warm, may be transported over long distances as mentioned above before cooling to a temperature level of hydrate formation occurring.

The reduction in water content of the first gas phase in conduit 2 in relation to the second gas phase in conduit 8, is in the range of 80-98% or about 97%, by the use of the cooler 20 and separator 30.

A pressure increasing device such as a compressor 50 or pump may in addition be installed on the resulting second gas phase stream of conduit 8, wherein the second gas phase will exit said compressor 50 or pump at elevated pressure in a conduit 11.

In order to transport the second gas phase with reduced water content of conduit 8, possibly compressed of conduit 11, to a processing unit, such as a process plant on land, a small amount of hydrate inhibitor may be added to the second gas phase by an inhibitor addition/injection conduit 9. Any hydrate inhibitor addition, such as glycol injection into the second gas phase stream, must be performed after the optional compressor 50 in order to avoid liquid in said compressor 50.

The amount of hydrate inhibitor needed for transporting the second gas phase with reduced water content in conduit 8 or 11, compared to the amount of inhibitor needed for the same transport of the first gas phase exiting the first separator 10 in conduit 2, is significantly reduced. The resulting reduction in hydrate inhibitor needed (such as MEG) in said gas phases is typically in the order of 80-98%.

In addition, a compressor or a pump on the combined liquid phase of conduit 7 (not shown) may be used for boosting, or for ease of transport of the first liquid phase to further processing plants.

A key element in the present process setup is the subsea gas cooler 20 where the gas outlet temperature of the first gas phase 5 may be controlled. Such a cooler is the subject of a separate patent application with a more detailed description of this unit.

Figure 2:
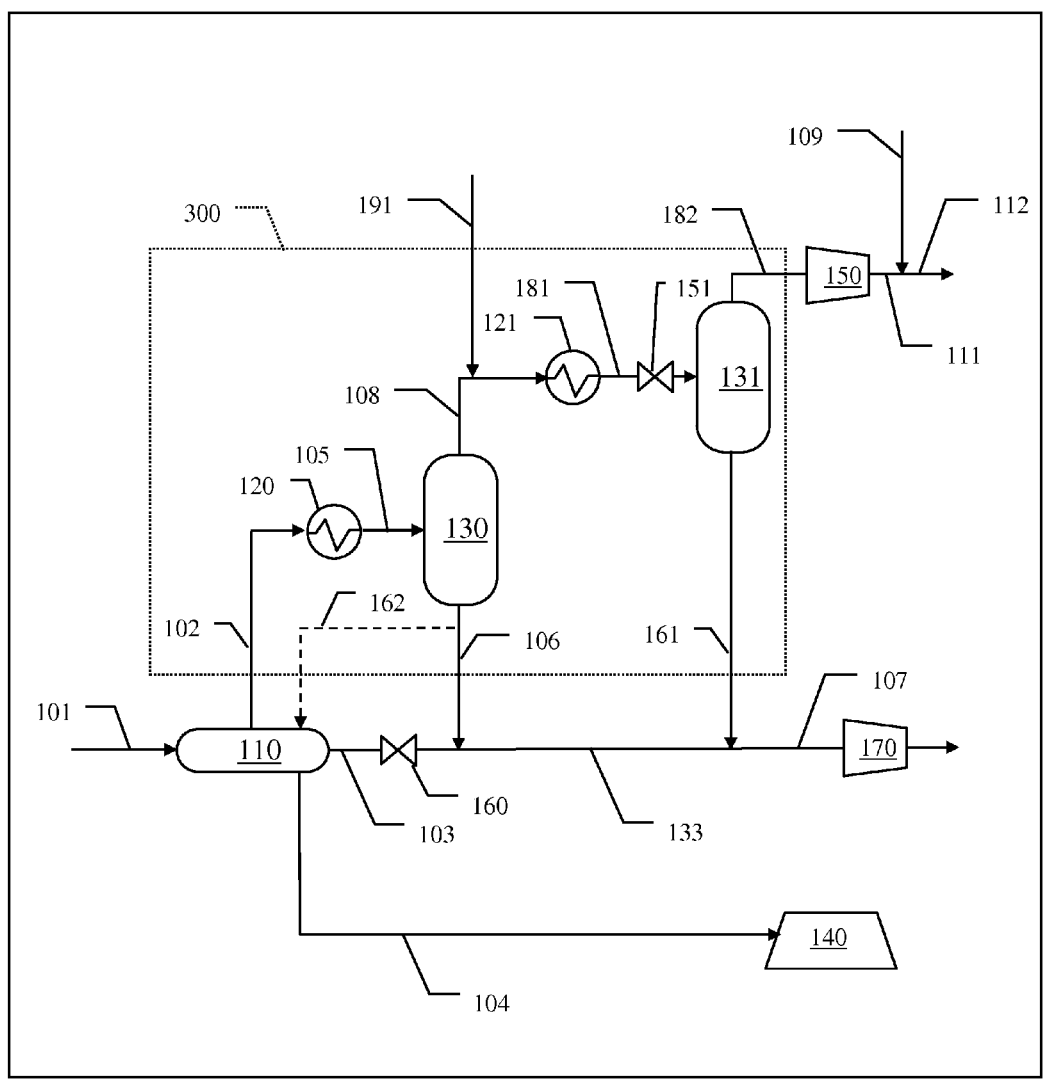
FIG. 2 shows a schematic view of an alternative embodiment of a subsea plant for water dew point depression and water removal according to the present invention.

FIG. 2 shows an alternative two-step cooling section 300 wherein an additional second cooler 121 and third separator 131 is used for accurate cooling of the second gas phase in the embodiment above and separating a third gas phase in a conduit 182 and water in a third liquid phase in a conduit 161.

Hence, FIG. 2 shows an alternative embodiment of a process layout for a system and method according to the invention wherein a multiphase hydrocarbon-containing well stream in a pipeline 101 is first separated into:

a first gas phase in a conduit 102;
a first hydrocarbon liquid phase in a conduit 103; and
a liquid water phase in a conduit 104 by a first three-phase separator 110, which may be a conventional separator as described above.

The well stream may contain a certain amount of water of which the bulk part is separated off in separator 110. The separated liquid water phase in conduit 104 may be re-injected in the sub terrain formations by well head 140.

The first gas phase in conduit 102 is then, as above, cooled in a first multiphase gas cooler 120 to a temperature as low as possible to knock out water, but not into the hydrate formation temperature region. Condensed liquids of water and condensate are passed together with gas from the cooler 120 by conduit 105 to a second separator 130 such as a condensed water scrubber, where the phases are separated into a second gas phase exiting at the top of the separator by conduit 108 and a liquid phase exiting at the bottom of the separator 130 by conduit 106. The second separator 130 may, as mentioned earlier, be a conventional separator or of more compact separation technology, e.g. of inline separation technology or a scrubber.

The condensed liquids from the second separator 130 are taken off in conduit 106 and mixed with the bulk liquid phase in conduit 103, which may be a mainly hydrocarbon containing stream from the first separator, to a combined liquid phase in conduit 133.

The water content of the first gas phase in conduit 102 is hence reduced in relation to the gas phase in conduit 105 after the cooler 120 and the second gas phase in conduit 108 after the separator 130, in the order of 80-98% or about 97%.

The second gas phase in conduit 108 contains a reduced amount of water and its temperature may be close to the hydrate formation temperature. Before further cooling and removal of water, a hydrate inhibitor, such as MEG, is added to the second gas phase before entering a second cooler 121, by an addition/injection conduit 191 in order to prevent hydrate formation within the cooler.

The hydrate inhibitor addition allows the second gas phase to be cooled to a lower temperature than that of the first gas phase, such as close to or about equal to the surrounding sea water temperature, for example in the range of 0-5° C. or further to a temperature as low as possible to knock out the maximum amount of water.

The cooled second gas phase and condensed liquids of water and condensate thereof are passed from the cooler 121 by a conduit 181 to a third separator 131, which may be similar to the second separator 130, where the phases are separated into a third gas phase exiting at the top by conduit 182 and a third liquid phase exiting at the bottom by conduit 161.

Conduit 181 may additionally be equipped with a choke valve 151. The choke valve 151 enables to regulate the expansion of the second gas phase and thereby cooling down said phase due to the Joule Thomson or Joule-Kelvin effect, such as below the seawater temperature. The second cooler 121 and choke valve 151 may be used together or separately in order to obtain the desired cooling of the fluid in conduit 181.

As mentioned above, the two-step cooling and separation system comprising the first and second coolers 120 and 121 and the second and third separators 130 and 131, may be regarded as one cooling unit 300, wherein a first gas phase enters by conduit 102 and where nearly dry gas phase, possibly inhibited by a small amount of hydrate inhibitor exits by conduit 182. Liquid water and possible additional condensates exits the cooling and separation system of cooling unit 300 by one or more conduits 106 and 161, which may be combined before mixing with the liquid stream in conduit 103 from the first separator 110 to a common conduit 107.

A pressure increasing device such as a compressor 150 or pump may in addition be installed on the resulting third gas phase stream of conduit 182, exiting at elevated pressure in conduit 111.

In order to transport the third dry and possibly compressed gas phase safely to a processing unit, a small amount of hydrate inhibitor may be added, if not added earlier or in addition to earlier injections (such as before the second cooler 121), to the gas phase by an inhibitor addition conduit 109. If added, the hydrate inhibitor addition is as mention above, performed after the compressor 150 to avoid liquid in the compressor 150.

However, by adding hydrate inhibitor before the second cooler 121 by conduit 191, the third gas phase may contain sufficient hydrate inhibitor when exiting the separator 131 which is not condensed and removed therein, to be inhibited for further transport. Said gas phase may be transported as a one-phased stream without the need for any additional hydrate inhibitor and wherein condensation in the pipeline is avoided.

The condensed liquids from the second separator 130 leaving in conduit 106 and the condensed liquids from the third separator 131 leaving in conduit 161 are mixed with the bulk liquid phase in conduit 103, from the first separator 110 into a first combined liquid phase in conduit 133 and a second liquid phase in conduit 107 respectively. A regulating valve 160 on conduit 103 upstream of the mixing points of conduits 106 and 161 may be present, in order to prevent flashback into the separator and/or to regulate the mixing rate and composition of said streams. Similar valves may be present on conduits 106 and 161 or as part of separators 130 and 131 respectively, before said mixing points to regulate the levels of said separator tanks (not shown). Alternatively, the liquid phase form the second separator 130 may be fed by a conduit 162 back into the first three-phase separator 110, for example to reduce the amount of water in the bulk liquid phase and hence reducing the risk of hydrate formation in conduit 107.

A compressor or a pump 170 on conduit 107 may be used for boosting or for ease of transport of the bulk liquid phase to further processing plants.

Said combined liquid phases in conduit 107 are warm and may be transported over long distances as mentioned above before cooling to a temperature level where hydrate formation may occur.

With the present invention it may be possible to reduce the amount of hydrate inhibitor/MEG needed to prevent hydrate formation by 97% as will be shown in the example below. This reduces the impact on existing hydrate inhibitor (such as MEG) regeneration units, currently used on the receiving facilities. If the hydrate inhibitor volumes are small enough, the amounts may be collected and transported for regeneration elsewhere and do not necessitate regeneration units on the receiving site. By use of alternative hydrate inhibitors to the current inhibitors, at low dosages, such hydrate inhibitors may follow the water production and need not be reused or regenerated. A low consumption of hydrate inhibitor made possible by the above described subsea water knock out, is therefore favourable both with respect to economy and the environment.

With the new technology of the present invention, the gas stream is fully inhibited for hydrate formation over long distances and a larger un-insulated and more economic pipelines may be used. Such pipelines provides less pressure drop, which eliminates or reduces the need for boosting and increases flexibility with respect to production rates and tie in of new fields, especially compared to existing insulated pipelines of reduced diameter.

With the aid of the present invention, it may also be possible to produce marginal fields to existing infrastructure in a flexible and efficient way, i.e. without increasing the current capacity of regeneration of hydrate inhibitor. Unfavourable and inflexible solutions may also be avoided in the sense that the pipelines which may be used, as described above, have a larger operational window.

Example 1

With a temperature of the multiphase hydrocarbon-containing stream 1 and the first separator 10 of 100° C., the water content of the gas is 1.5 mol %. For a certain specific gas rate it would require about 24 m$^3$/d 90 wt % hydrate inhibitor (MEG) to prevent hydrates forming in a gas pipeline. By cooling the gas to 30° C. according to the present invention, and separating out condensed water, the required consumption of 90 wt % hydrate inhibitor (MEG) is reduced to about 0.8 m$^3$/d, which corresponds to a reduction in MEG of about 97%.

The invention claimed is:

1. A method for water dew point depression subsea in a produced multiphase hydrocarbon fluid stream containing water, the method comprising the steps of:
   subsea separating the hydrocarbon fluid stream into a first liquid phase and a first gas phase;
   subsea cooling the first gas phase in a controlled manner to knock out water or condense water and optionally other condensates into a second liquid phase while keeping the fluid above a hydrate formation temperature thereof;
   subsea separating off the second liquid phase and a second gas phase; wherein the second gas phase has a water dew point which is lower than that of the first gas phase and/or the initial multiphase hydrocarbon fluid stream;
   adding hydrate inhibitor to the second gas phase;
   cooling the second gas phase in a controlled manner to knock out water or condense water and optionally other condensates into a third liquid phase; and
   separating off the third liquid phase and a third gas phase, wherein the third gas phase has a lower water dew point than the second gas phase.

2. A method according to claim 1, wherein the first gas phase is cooled down to a temperature above 20° C.

3. A method according to claim 1, wherein the cooled first gas phase is free of hydrate inhibitor and/or absorbent.

4. A method according to claim 1, wherein the second gas phase is cooled down to a temperature below 25° C.

5. A method according to claim 1, wherein a hydrate inhibitor is added to the third gas phase before further transport over a distance subsea.

6. A method according to claim 1, wherein the third gas phase is compressed before optional addition of hydrate inhibitor and transport over a distance subsea.

7. A method according to claim 1, wherein the cooled second gas phase is choked after the step of cooling the second gas phase and before the step of separating off the third liquid phase and third gas phase.

8. A method according to claim 7, wherein the second gas phase is cooled down to a temperature of about sea temperature, or below sea temperature.

9. A method according to claim 1, wherein liquid water additionally is separated from the produced multiphase hydrocarbon fluid stream in the step of subsea separating the hydrocarbon fluid stream into the first liquid phase and the first gas phase.

10. A method according to claim 9, wherein said separated liquid water is re-injected in sub terrain formations.

11. A method according to claim 1, wherein knocked out water or condensed water and other condensates from the separation in the step of subsea separating off the second liquid phase and second gas phase and optionally the step of separating off the third liquid phase and third gas phase are mixed with the first liquid phase from the separation in the step of subsea separating the hydrocarbon fluid stream into the first liquid phase and first gas phase.

12. A method according to claim 1, wherein the second liquid phase from the step of subsea separating off the second liquid phase and second gas phase and optionally the third liquid phase from the step of separating off the third liquid phase and third gas phase are recycled to the separation in the step of subsea separating the hydrocarbon fluid stream into the first liquid phase and first gas phase.

13. A method according to claim 1, wherein the first liquid phase, optionally mixed with the second liquid phase and optionally the third liquid phase is transported to further processing plants, alternatively with the help of boosting.

14. A method according to claim 1, wherein the hydrate inhibitor is chosen from one or more of:
thermodynamic inhibitors, ethanol, methanol, glycols, monoethylene glycol (MEG), dicthylcnc glycol (DEG), methylene glycol (TEG), amines, monoethanolamine (MEA) or methyldiethanolamine (MDEA); or
kinetic inhibitors, anti-agglomerants, low dosage hydrate inhibitors (LDHI), polymers, copolymers or surfactants.

15. A method according to claim 1, wherein the second gas phase is cooled down to a temperature to about the surrounding sea water temperature.

16. A method for water dew point depression subsea in a produced multiphase hydrocarbon fluid stream containing water, the method comprising the steps of:
subsea separating the hydrocarbon fluid stream into a first liquid phase and a first gas phase;
subsea cooling the first gas phase in a controlled manner to knock out water or condense water and optionally other condensates into a second liquid phase while keeping the fluid above a hydrate formation temperature thereof; and
subsea separating off the second liquid phase and a second gas phase; wherein the second gas phase has a water dew point which is lower than that of the first gas phase and/or the initial multiphase hydrocarbon fluid stream,
wherein a hydrate inhibitor is added to the second gas phase so as to remain present in the second gas phase during further transport over a distance subsea.

17. A method according to claim 16, wherein the first gas phase is cooled down to a temperature above 20° C.

18. A method according to claim 16, wherein the cooled first gas phase is free of hydrate inhibitor and/or absorbent.

19. A method according to claim 16, wherein the second gas phase is compressed before addition of hydrate inhibitor and transported over a distance subsea.

20. A method according to claim 16, wherein liquid water additionally is separated from the produced multiphase hydrocarbon fluid stream in the step of subsea separating the hydrocarbon fluid stream into the first liquid phase and first gas phase.

21. A method according to claim 20, wherein said separated liquid water is re-injected in sub terrain formations.

22. A method according to claim 16, wherein knocked out water or condensed water and other condensates from the separation in the step of subsea separating off the second liquid phase and second gas phase are mixed with the first liquid phase from the separation in the step of subsea separating the hydrocarbon fluid stream into the first liquid phase and first gas phase.

23. A method according to claim 16, wherein the second liquid phase from the step of subsea separating off the second liquid phase and second gas phase is recycled to the separation in the step of subsea separating the hydrocarbon fluid stream into the first liquid phase and first gas phase.

24. A method according to claim 16, wherein the first liquid phase, optionally mixed with the second liquid phase is transported to further processing plants, alternatively with the help of boosting.

* * * * *